United States Patent Office 3,631,116
Patented Dec. 28, 1971

3,631,116
PROCESS FOR THE MANUFACTURE OF
CARBON TETRACHLORIDE
Lothar Hornig, Helmut Meidert, and Wilhelm Riemenschneider, all of Farbwerke Hoechst AG, Frankfurt am Main, Germany
No Drawing. Filed Jan. 8, 1969, Ser. No. 789,965
Claims priority, application Germany, Jan. 12, 1968,
P 16 68 074.3
Int. Cl. C07c *17/10, 17/24, 19/06*
U.S. Cl. 260—662 R                    2 Claims

ABSTRACT OF THE DISCLOSURE

Improvement in a process for the manufacture of carbon tetrachloride by chlorination of aromatic hydrocarbons consisting in maintaining the intermediately formed hexachlorobenzene in solution in carbon tetrachloride at elevated temperature and pressure and removing it in this form or returning it continuously to a chlorolysis reaction.

---

The present invention relates to a process for the manufacture of carbon tetrachloride.

By the reaction of aromatic hydrocarbons with chlorine at elevated temperatures and, if desired, elevated pressures, mixtures of carbon tetrachloride with hexachlorobenzene are obtained. Depending on the reaction conditions used, chlorinated hydrocarbons are also formed as intermediate and by-products. The quantitative proportion of carbon tetrachloride to hexachlorobenzene depends on the reaction conditions used; it is shifted in favor of carbon tetrachloride when the reaction pressure is increased and a larger excess amount of chlorine is used. It has been found, however that in spite of an increased pressure and increased amount of chlorine used as starting material, an amount of hexachlorobenzene which considerably interferes with the process is always contained in the reaction product. Owing to the high melting point of 227° C. of hexachlorobenzene and its pronounced tendency to sublimation, deposits of hexachlorobenzene readily cause clogging of, for example, pipes, manometers and valves, thus leading to working troubles or interruptions of the process. Since hexachlorobenzene can be further chlorinated, it is only an intermediate product in the manufacture of carbon tertachloride. It must therefore be used again for the chlorination in the manufacture of carbon tetrachloride. When the process is carried out continuously it has to be recycled. Such a return of the hexachlorobenzene is beset with technical difficulties owing to the above properties of hexachlorobenzene, that is its high melting point and pronounced tendency to sublimation, because all pumps, pipes, valves and other apparatus must be heated carefully.

The present invention provides a process for the continuous manufacture of carbon tetrachloride by chlorination of aromatic hydrocarbons with chlorine at elevated temperature under atmospheric or superatmospheric pressure, which comprises maintaining the hexachlorobenzene which has been formed in the course of the reaction or introduced into the reaction products, in solution in carbon tetrachloride at a temperature of above 76.7° C. under a pressure which corresponds at least to the vapor pressure of the carbon tetrachloride and removing it discontinuously in the form of this solution from the reaction system or returning it continuously to the reaction stage of the chlorolysis.

This technically simple measure in accordance with the invention enables the hexachlorobenzene to be conveyed through pumps, pipes filters or other apparatus at considerably lower temperatures than 227° C. without any clogging. The choice of an appropriate solvent for hexachlorobenzene, for which only few solvents have been known, is rendered even more difficult by the requirement that the solvent must not react with chlorine under the reaction conditions nor be otherwise altered. The usually suited hydrocarbons, for example, cannot therefore be used. Moreover, the solvent must not form an azeotrope with the reaction products of the chlorolysis, it must be easily accessible technically and safe to handle. These requirements are fulfilled by carbon tetrachloride used in accordance with the invention. It was furthermore surprising that the solubility in carbon tetrachloride of the relatively difficultly soluble hexachlorobenzene which is only 5.5% by weight at 76.7° C., that is the boiling point of carbon tetrachloride, rises to 35% by weight, that is about 7 times the amount, at 150° C. and 75% by weight, that is about 14 times the amount, at 200° C. It is particularly advantageous that no miscibility gap appears in the solution of hexachlorobenzene in carbon tetrachloride at elevated temperatures, which would strongly interfere with the process of the invention. It is particularly surprising that even in highly concentrated solutions of hexachlorobenzene in carbon tetrachloride the tendency of hexachlorobenzene to sublimation is completely suppressed and can no longer give rise to trouble. This ensures safe working of all apparatus and parts of the plant which come into contact with hexachlorobenzene.

When carrying out the process of the invention in practice, the mixture of carbon tetrachloride and hexachlorobenzene obtained by the chlorinating splitting (chlorolysis) of aromatic hydrocarbons is subjected to distillation to obtain the carbon tetrachloride, which is the main product in a pure form. In spite of its pronounced tendency to sublimation, the hexachlorobenzene dissolved in carbon tetrachloride accumulates quantitatively in the sump of the distillation column. Care must be taken, however, not to distill off too high a proportion of carbon tetrachloride from the sump, but to maintain in the sump a determined amount thereof which may be varied within wide limits and which depends on the pressure and the temperature. By proceeding in this manner, the hexachlorobenzene is kept in solution, thus enabling a continuous removal from the distilling vessel. The mixture of hexachlorbenzene and carbon tetrachloride may then be return to the reaction stage of the chlorolysis or it may be pumped into a cooling vessel in which the hexachlorobenzene crystallizes out and is separated by filtration or centrifuging according to known methods.

The following examples serve to illustrate the invention, but are not intended to limit it.

EXAMPLE 1

A mixture of 370 grams carbon tetrachloride and 28 grams hexachlorobenzene was continuously introduced per hour by a pump into a glass distillation column having a height of 2 meters and an inside diameter of 25 centimeters. The distillation was carried out with a return ratio of 1:1. At the head of the column pure carbon tetrachloride of a boiling point of 76.7° C. which contained less than 10 p.p.m. hexachlorobenzene was obtained. The sump of the column was kept at 160° C. and then contained 40 to 41% by weight hexachlorobenzene. By frequent removal of the mixture of hexachlorobenzene and carbon tetrachloride through pipes heated at 160° C., an about constant level was maintained in the sump. The removed mixture of hexachlorobenzene and carbon tetrachloride was cooled in one instance to separate the hexachlorobenzene by crystallization and filter it off in a very pure form. In another instance, the mixture of hexachlorobenzene and carbon tetrachloride was returned by a pump to a reactor where the aromatic hydrocarbons were reacted with chlorine to carbon tetrachloride.

EXAMPLE 2

A mixture of 85% carbon tetrachloride and 15% hexachlorobenzene was continuously distilled in a steel pressure column at a pressure of 15 atmospheres absol. The return ratio was 0.5:1. At a boiling point of 198° C. pure carbon tetrachloride was withdrawn. The sump was maintained at 250° C. and then contained about 50% hexachlorobenzene and 50% carbon tetrachloride. The solution of hexachlorobenzene in carbon tetrachloride removed from the sump was further treated as described in Example 1.

What is claimed is:

1. In a chlorolysis process for the continuous manufacture of carbon tetrachloride by chlorination of aromatic hydrocarbons with chlorine at elevated temperature under atmospheric or superatmospheric pressure, the improvement comprising: maintaining hexachlorobenzene, which has been formed during the reaction or introduced into the reaction zone with the reactants, in carbon tetrachloride solution at temperatures in the range from 76.7° C. to 250° C. and under a pressure corresponding at least to the vapor pressure of the carbon tetrachloride and removing said hexachlorobenzene discontinuously in the form of this solution as a stream from the reaction zone or returning it continuously to said chlorolysis reaction.

2. The process of claim 1 wherein 5.5 to 75% by weight hexachlorobenzene is dissolved in carbon tetrachloride.

References Cited

UNITED STATES PATENTS 2,854,491    9/1958    Kung _____ 260—662 R

OTHER REFERENCES

Hoechst, Chem. Abstracts 64, 3350(b) (1966).

DANIEL D. HORWITZ, Primary Examiner

U.S. Cl. X.R.

260—664